Feb. 20, 1968 — R. B. STANLEY — 3,369,462
LINEAR ACTUATOR
Filed Feb. 1, 1966 — 5 Sheets-Sheet 3

Inventor
Richard B. Stanley
By Mann, Brown & McWilliams
Attys.

United States Patent Office 3,369,462
Patented Feb. 20, 1968

3,369,462
LINEAR ACTUATOR
Richard B. Stanley, 618 Edgemont Lane,
Park Ridge, Ill. 60068
Filed Feb. 1, 1966, Ser. No. 524,037
9 Claims. (Cl. 91—413)

ABSTRACT OF THE DISCLOSURE

The invention relates to a linear actuator, and more particularly to a device for converting rotary motion to linear motion, or vice versa, employing a novel and highly simplified hydraulic collet device for gripping the member to be moved, which involves a series of bladders or chambers filled with hydraulic liquid and arranged in a hermetically sealed relation to lock and release in a sequential manner to effect a step by step relative movement of, or a secure holding action between, two telescopingly related members under infinitely variable load conditions between no load and maximum design conditions of the device.

---

My invention relates to a linear actuator, and more particularly, to a device for converting rotary motion to linear motion, or vice versa, employing a novel and highly simplified hydraulic collet device for gripping the member to be moved.

Conventional linear actuator devices employ complicated hydraulics and/or gearing levers, couplings, and the like that operate at a relatively low efficiency and that are expensive to make and maintain due to the complex construction involved.

A principal object of my invention is to provide a step-by-step linear actuator that not only operates at an efficiency on the order of 85 percent, but which also is greatly simplified and compact in arrangement.

Another principal object of the invention is to provide a hydraulically actuated linear actuator that is hermetically sealed and requires only about one-third of the volume of hydraulic liquid used in conventional devices of this type.

Still another principal object of the invention is to provide a linear actuator involving members in telescoping relation employing a novel hydraulic collet or lock device that provides instantaneous locking and release.

Other objects of the invention are to provide a basic organiaztion for a linear actuator that is equally suited for embodiment in either massive structures such as automobile rack lifts or miniaturized push-pull devices that may have a diameter or the thickness on the order of an inch and a half, to provide novel collet type locking devices and static seals for use in my linear actuator arrangement, and to provide a linear actuator that is economical of manufacture, convenient in use and readily adapted for a wide variety of applications.

Other objects, uses, and advantages will be obvious or become apparent from a consideration of the following detailed description and the application drawings.

However, it is to be distinctly understood that the specific drawing illustrations provided are supplied primarily to comply with the requirements of the patent statutes and that the invention may have many other specific embodiments that will be obvious to those skilled in the art.

GENERAL DESCRIPTION

Figures 1, 2, 3:
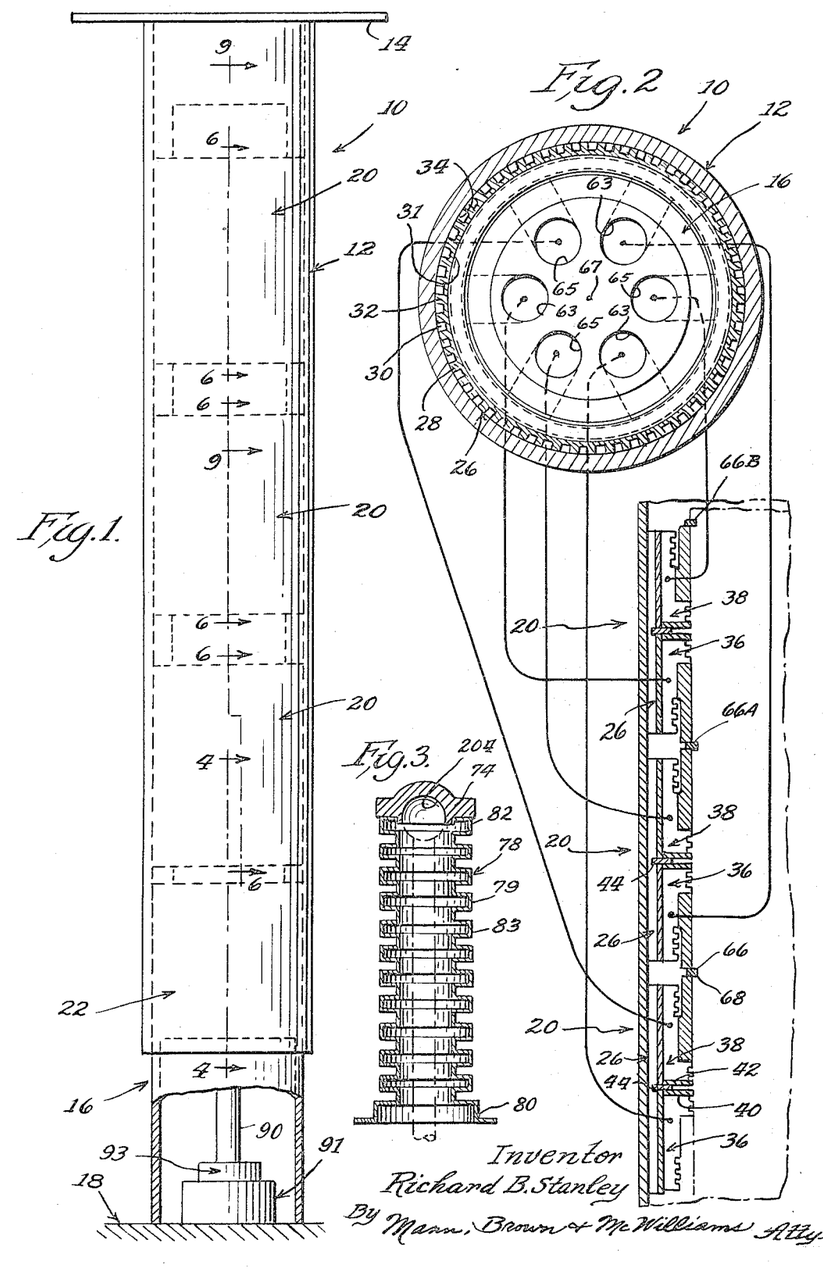
FIGURE 1 is a diagrammatic side elevational view of a jack embodying the basic features of the invention.
FIGURE 2 is a composite illustration combining a transverse sectional view of the device taken substantially along line 2—2 of FIGURE 1 and a fragmental longitudinal section view of the device, showing schematically the manner in which the hydraulic conduiting of the jack is connected between the respective collet devices of the jack and the jack actuating pump.
FIGURE 3 is a longitudinal sectional view through a static seal as employed in connection with the pump arrangement shown in FIGURE 4.

Reference numeral 10 of FIGURE 1 generally indicates a jack device embodying the basic features of the present invention and comprising a vertically movable tubular member 12 carrying at its upper end a support platform 14 for engaging and supporting a load to be lifted. Tubular member 12 is received over a support member 16 which has its lower end engaging a suitable support or base structure 18, such as a foundation arranged to support the device 10 and its load.

Associated with the support 16 are three lifting and locking collet devices 20, located approximately where indicated by the reference numerals 20 in the illustration of FIGURE 1, and a hydraulic actuator unit 22 located approximately where indicated by reference numeral 22 of FIGURE 1.

Referring to FIGURES 2, 4, 6 and 9, each device 20 comprises a sleeve 26 received between the members 12 and 16 and having its periphery 28 formed with a plurality of closely spaced longitudinally extending recesses 30 which are sufficiently deep that they leave a connecting web 31 between the resulting ribs 32 that is on the order of five thousandths of an inch. It is intended that the respective sleeves 26 not be split or entirely severed by the recesses 30, although it is intended that the respective sleeves will expand somewhat when pressed against the internal surface 34 of tubular member 12 during operation of the respective devices 20 and thus be resiliently flexible circumferentially thereof.

Each of the sleeves 26 has received therein a pair of oppositely arranged annular collet members 36 and 38 that at their adjacent ends have affixed thereto relatively thick annular flange members 40 and 42, respectively. The flange members 42 respectively seat against a locking ring 44 that is received within recess 46 formed in the bore of the respective sleeves 26.

Figure 7:
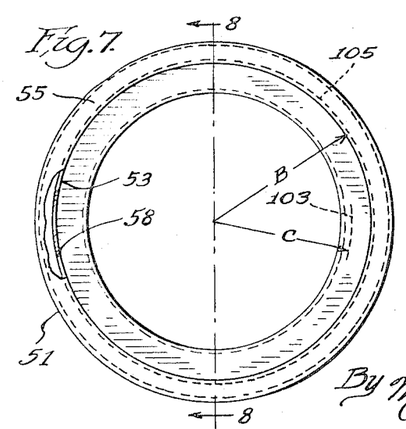
FIGURE 7 is a plan view of one of the collet devices employed in this invention.
Figure 8:
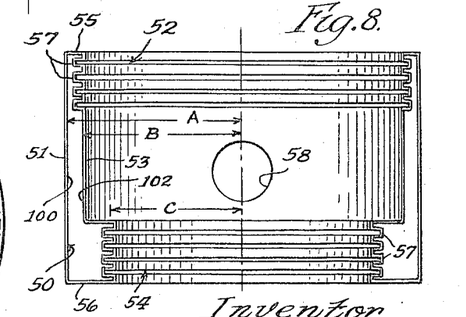
FIGURE 8 is a sectional view taken along line 8—8 of FIGURE 7.
Figure 9:
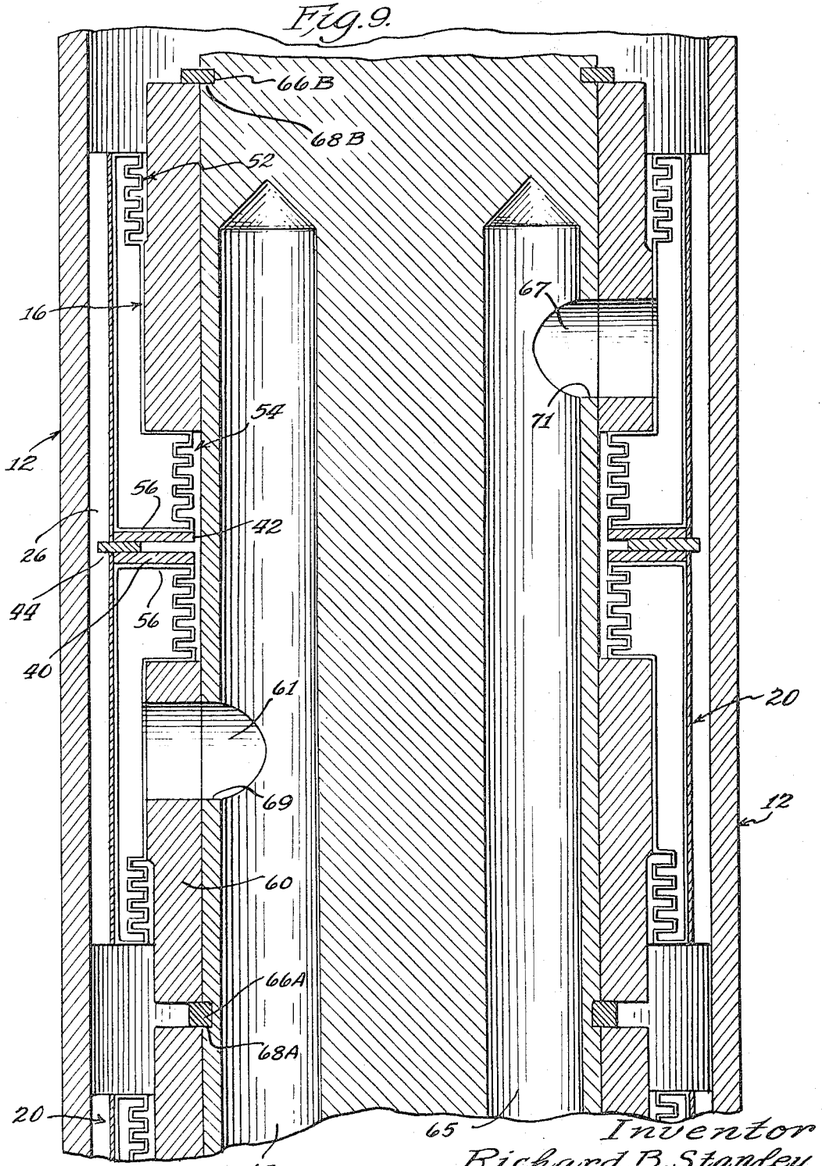
FIGURE 9 is similar to that of FIGURE 6 but represents the structural features viewed along line 9—9 of FIGURE 1.

The respective collet members 36 and 38 have the general configuration shown in FIGURES 7 and 8 and are preferably formed from stainless steel having a thickness lying in the range of from about .005 inch to about .010 inch. The respective collet members 36 and 38 are annular in nature and each defines an outer side wall 51 and an inner side wall 53 which are united by end walls 55 and 56. The inner wall 53 is of stepped diameter configuration and includes undulating portions 52 and 54 defined by convolutions 57 which provide a measure of flexibility in the respective devices 36 and 38 longitudinally of their respective central axes.

The respective devices 36 and 38 thus each define an annular hydraulic chamber 50 which is intended to be completely filled with hydraulic liquid, with the inner wall 53 being provided with a port 58 through which hydraulic liquid flows in passing to and from the respective chambers 50.

Figure 4:
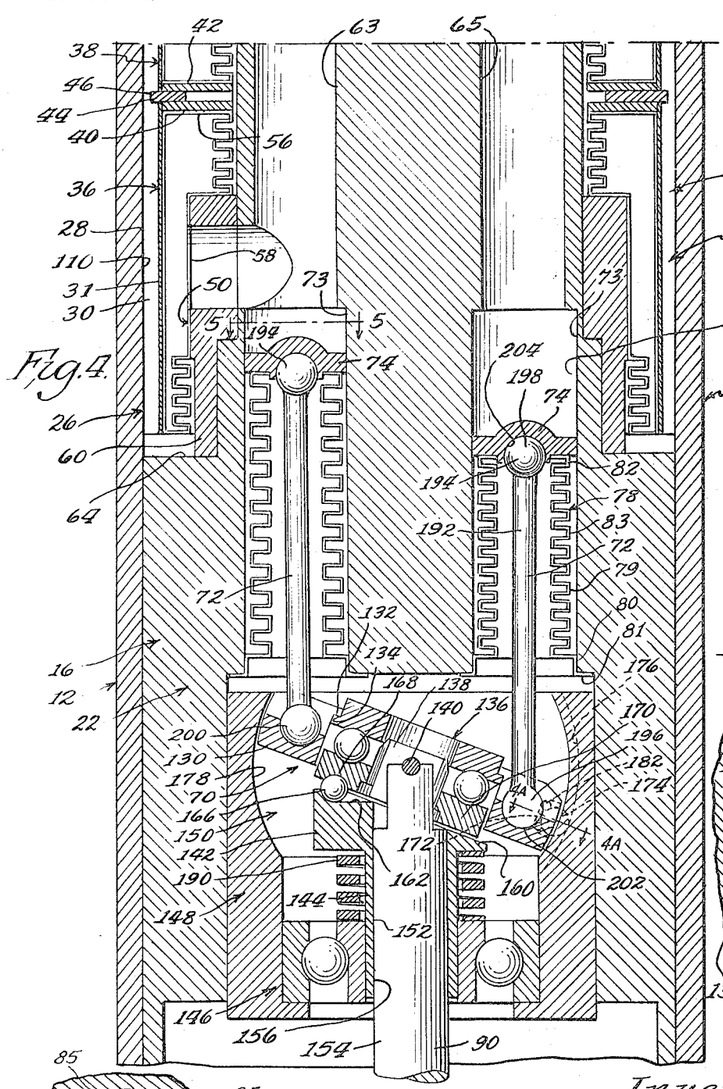
FIGURE 4 is a longitudinal cross-sectional view taken substantially along line 4—4 of FIGURE 1 illustrating the structural features of the wobble plate type pump employed in the illustrated jack together with the adjacent collet devices.
Figure 4A:
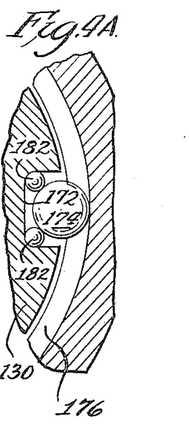
FIGURE 4A is a fragmental view taken substantially along the plane of the wobble plate shown in FIGURE 4 showing a roller guide arrangement employed between the wobble plate and the jack housing.
Figure 6:
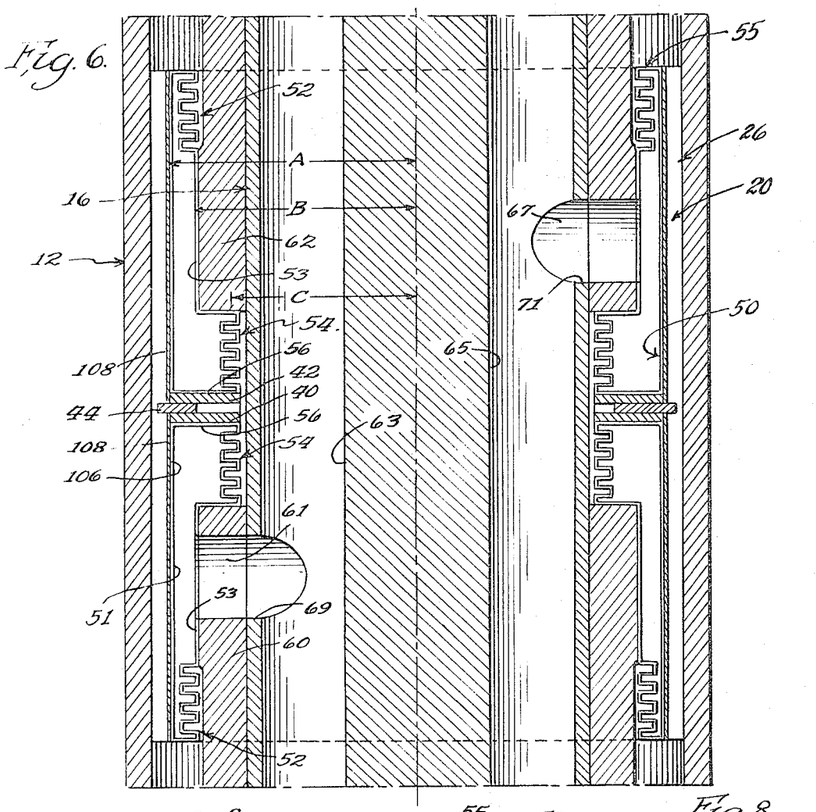
FIGURE 6 is similar to that of FIGURE 4 but is representative of the structural features shown by viewing along each of the lines 6—6 of FIGURE 1.

As indicated in FIGURES 4 and 6, the respective devices 36 and 38 are applied within the respective sleeves 26 in such a manner that their end walls 56 abut against the respective annular flanges or discs 40 and 42. The inner walls 53 of the respective devices 36 and 38 seat against the respective annular abutment rings 60 and 62 that are in turn received over support member 16. In the lowermost device 20 the abutment ring 60 rests on shoulder 64 formed in the support member 16, and at the other end of the sleeve 26 of the lower device 20, the abutment ring 62 is held in place by a locking ring 66 seated within a recess 68 formed in the support 16 (see FIGURE 2). The abutment rings 60 and 62 of the next device 20 are arranged similarly, the abutment ring 60 of this device 20 being seated on the lock ring 66 and the lock ring 62 thereof being held in place by a second lock ring 66A received in recess 68A formed in support 16.

The abutment rings 60 and 62 of the uppermost device 20 are similarly arranged, the abutment ring 60 of this device seating against the locking ring 66A and the abutment ring 62 being restrained by locking ring 66B received in recess 68B of member 16.

The abutment rings 60 and 62 of the respective devices 20 are each formed with ports 61 and 67 which respectively communicate between the ports 58 of the respective devices 36 and 38 and ports 69 and 71 formed in member 16.

The member 16 is formed to define a conduit passage 63 for each port 69 and a separate conduit passage 65 for each port 71. As indicated in FIGURE 2, the passages 63 and 65 are equally distributed around the central axis 67 of member 16, and at their lower ends the respective passages 63 and 65 communicate with the respective piston chambers 73 formed in the base of the member 16 to form part of the hydraulic actuating device 22 (see FIGURE 4).

The hydraulic actuating device 22 is located in the specific arrangement of FIGURES 1-9 where generally indicated by reference numeral 22 in FIGURE 1 and comprises a wobble plate structure 70 actuating a plurality of piston rods 72 which in turn actuate piston members 74 operating in piston chambers or bores 73.

As indicated in FIGURE 2, in the specific arrangement shown the piston chambers 73 and their corresponding passages 63 and 65 are six in number.

Each piston rod 72 and piston member 74 has associated therewith a special static type seal 78 which comprises a thin walled annular member 79 formed from stainless steel or the like (having a thickness similar to that of members 36 and 38) and having its end portion 80 affixed as by brazing to the member 16 as at 81 and its end portion 82 affixed as by brazing to the piston member 74.

Figure 5:
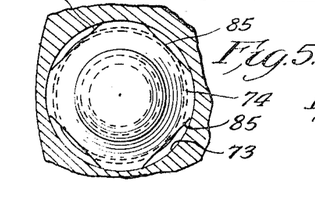
FIGURE 5 is a fragmental view taken substantially along line 5—5 of FIGURE 4.

The piston chambers 73 are preferably made cylindrical in configuration while the piston members 74 are polygonal in configuration (see FIGURE 5).

It is intended that the connections of the seal 78 at its end portion 80 and at piston member 74 be leak-proof, and that hydraulic liquid completely fill the space within the chambers 50, ports 58, ports 61 and 67, ports 69 and 71, passages 63 and 65, and the portions of piston chamber 73 that are externally of the respective seals 78. Consequently, hydraulic liquid is disposed around the external surfaces 83 of the respective seals 78 and passes between the planar sides 85 of the piston member and the wall 86 defining the respective bores 73.

The wobble plate structure 70 is rotated by shaft 90 that is actuated by a suitable electric motor or the like generally indicated at 91 in FIGURE 1. Preferably, a suitable magnetic brake device indicated at 93 is operably associated with the shaft 90 and is electrically connected so that when motor 91 is turned off, the magnetic brake is turned on and maintains shaft 90 against rotation. This may be done in any suitable manner that will be immediately apparent to those skilled in the art.

When it is desired to raise a load resting on platform 14, the wobble plate structure 70 is actuated by releasing brake 93 and operating motor 91 to rotate shaft 90 in the appropriate direction to reciprocate piston rods 72 and thus piston members 74. As the wobble plate structure 70 rotates, the piston members 74 reciprocate within their respective bores or chambers 73.

The orientation of the wobble plate structure 70 with respect to the collect members 36 and 38 is such that when the shaft 90 is turned in one direction of rotation, hydraulic liquid is displaced from the respective piston chambers 73 into the respective collet members 36 while simultaneously a corresponding amount of hydraulic liquid is displaced from the respective collet members 38 and returns to the piston chambers to which they are connected through passages 65.

The collet members 36 and 38 are arranged in accordance with the teachings of my copending application Ser. No. 513,360, filed Dec. 13, 1965 and it will be noted that their side portions 51 and 53 are not of a uniform distance apart throughout the length of the respective collet members, but rather at the ends 56 of these members the side portions 51 and 53 define between them a cross-sectional area transversely of the members 12 and 16 that is larger than at the ends 55 of these members.

More specifically, on referring to FIGURES 6 and 8 it will be seen that at the end portion 55 of the collet members 36 and 38, the transverse cross-sectional area defined by the sides 100 and 102 of the chamber 50 is equivalent to the area obtained by using the radius indicated by dimension A (the internal diameter of the collet member side wall 51) employed as a factor in the usual circle area formula ($\pi R_2$) minus the area obtained by multiplying the radius indicated by dimension B (the radius of the exterior of side wall 53) in the same formula.

However, at the end wall 56 end of the collet members 36 and 38, the transverse cross-sectional area of the chamber 50 is equal to the area obtained by using the radius indicated by the aforementioned dimension A used as a factor in the usual area formula for a circle, and subtracting the area obtained by using the radius indicated by the dimension C (with the radius C extending to the average lateral depth of the convolutions 57 forming the undulated area 54, as this gives the effective internal diameter dimension at the end wall 56 end of the respective collet members 36 and 38).

For purposes of description I prefer to refer to the area obtained by subtracting the area of the circle 103 (see FIGURE 7) having the radius C from the area of the circle 105 having the radius B as the effective diametrical area of the respective members 36 and 38 for reasons that will now be described. This effective diametrical area will be hereinafter referred to for identification purposes as area X to simplify the terms used in the subsequent description.

In accordance with my said application Ser. No. 513,360 the collet members 36 and 38 are proportioned in length with respect to the area X so that the ratio of the area X over the area of contact of the respective collet members with the internal surface 106 of the respective sleeves 26 is no greater than the coefficient of friction between the respective collet devices and the respective sleeves 26. In other words, the ratio of the effective diametrical area X to the area of contact between the external surfaces 108 of the respective collet members 36 and 38 and the internal surface 106 of the respective sleeves 26 should be equal to or less than the coefficient of friction between these two surfaces.

I have found that when this dimensioning is observed, and the sleeve member 26 of a device 20 is urged in the direction of say end wall 56 of its member 36, the collet members 36 under the frictional forces acting between the collet member and surface 106 of the respective sleeves 26 will tend to move downwardly of member 16 and thus tend to reduce the volume of the chamber 50 of this device. If the wobble plate structure 70 is stationary there is no place for the hydraulic liquid in the chamber 50 of the device 36 to go, the hydraulic liquid tends to be compressed and the pressure within the chamber 50 increases thereby causing the wall 51 of the collet device to be firmly pressed against the inner surface 106 of the sleeve 26 and thereby not only prevent relative movement between the collet members 36 and the sleeve 26, but also cause the sleeve 26 to be firmly pressed and hydraulically clamped against the internal surface 110 of member 12.

However, if the sleeve member 26 is moved upwardly of the member 16, the same frictional forces acting between the collet members 36 and the sleeve member 26 tend to expand the chambers 50 of the respective devices 36 and reduce the pressure of the hydraulic liquid within same, which instantaneously releases any gripping action of the collet members 36 on the respective sleeve members 26. This would permit a ready sliding action between these two members if hydraulic liquid is passed from members 38 in an amount corresponding to the volume expansion of the respective members 36.

The same principle applies to the members 38, but in reverse as the relative positions of the members 38 are reversed from the positions of the members 36.

In the particular assembly of members 36 and 38 that is herein disclosed, as soon as the load is applied to the platform 14, the tubular member 12 is instantaneously gripped from being moved downwardly with respect to support 16 by the devices 36, as hydraulic liquids are substantially incompressible and there would be no noticeable movement of the collet members 36 downwardly of the support 16 in effecting the locking action of such devices.

The weight of the load acting on the tubular member 12 creates a frictional force on the respective sleeves 26 which tends to move them downwardly and thus moves the respective locking rings 44 downwardly and urges the annular flanges or discs 40 in the direction of the abutment rings 60 with the result that the rings 44 in bearing on annular rings 40, and annular rings 40 in bearing on end walls 56 of the devices 36 act as piston-like members on the liquid within the chambers 50 of the devices 36 to provide the pressure on the hydraulic liquid that effects the locking action achieved by the collet members 36, all without operation of wobble plate structure 70. Thus, in supporting a static load, the devices 36 form a wedge between the tubular member 12 and the support member 16.

It is to be noted that the proportioning of the side walls 51 and 53 of the members 36 and 38 that provides the area X dimensioning indicated is an essential to the practice of my invention as it is the presence of the effective diametrical area X that serves to reduce or decrease the volume of chamber 50 when wobble plate structure 70 is not functioning. This is what holds the load in the stationary position (assuming shaft 90 is braked against rotation). However, the shaping of the parts to achieve this end is largely optional as will now be apparent to those skilled in the art.

When it is desired to raise the load, the motor 91 is actuated to rotate the shaft 90 in the direction that will supply hydraulic liquid to the respective members 36 and withdraw a corresponding amount of hydraulic liquid from the respective members 38. As the piston member 74 of a particular chamber 73 moves upwardly of the showing of FIGURE 4 and thus away from the wobble plate structure 70, its seal 78 expands, which thus displaces the hydraulic liquid in the piston chambers 73 in question, which effects an increase in the pressure of the hydraulic liquid within the collet member 36 that is connected to the conduit 63 in question. The increase in pressure within the collet member 36 in question tends to expand it against the interior surface 106 of the sleeve 26 (with which the collet device 36 in question is associated) which in turn tends to expand this sleeve 26 slightly and bind it against the internal surface 110 of tubular member 12.

Simultaneously, the hydraulic liquid pressure acting on the compartively large surface defined by the end wall 56 of the device 36 in question effects a lifting action on the particular sleeve 26 in question through locking ring 44 which is transmitted to the tubular member 12 through the hydraulic lock that has been established between the particular member 36 in question and its sleeve 26.

The lifting action on the wall 56 of the member 36 expands this device slightly longitudinally of the device 10, and this effects a displacement of hydraulic liquid from the member 38 immediately above the particular member 36 in question, and the movement of the respective piston heads 74 of actuator 22 is such that the piston head 74 operating in the passage 65 that serves the particular member 38 in question contracts the seal 78 the amount required to receive the oil that is displaced from the member 38 in question.

FIGURE 4 indicates the fully extended and retracted positions of the piston members 74 within the respective chambers 73.

Further in accordance with this invention, the conduits 63 and 65 alternate about the longitudinal axis of support 16, and the respective members 36 are connected to passages 63 that are spaced 120 degrees apart about said axis while the members 38 are connected to the alternate passages 65 that are likewise spaced 120 degrees apart about said axis. Furthermore, the connections of the respective passages 63 and 65 to the respective members 36 and 38 is made such that a uniform holding or lifting action is provided on the member 12.

To achieve this, the orientation of the parts is made such that when the power stroke which effects the lifting action of one of the collet members 36 is being completed, the power stroke of another collet member 36 is just starting to provide the same effective lifting action on the member 12. Thus, in accordance with the present invention, the action of the various pistons is such that the lifting actions affected by the individual collect members 36 are blendingly related throughout the cycle of the hydraulic mechanism so that a continuous lifting action is applied to member 12 by the respective collet members 36, but in consecutive step-by-step manner. In other words, it is intended that as the lifting action or thrust provided by one of the members 36 falls off at the end of the power stroke of its piston member 74, the lift action or thrust provided by another member 36 is building up in the same proportion and the third member 36 is in the mid portion of its thrust applying stroke and provides a lifting action equivalent to the sum of the lifting action provided by the other two members 36, thus insuring the application of a uniform lifting action on member 12 that will be constant if the speed of wobble plate structure 70 is constant.

When the weight being lifted has been moved to the height desired, the motor 91 is shut off, which, in accordance with the described arrangement automatically puts magnetic brake 93 into locking engagement with the shaft 90. The load will thus be maintained at its achieved elevation indefinitely so long as the magnetic brake is not released because of the hydraulic wedge gripping action of members 36.

When it is desired to lower the load, the action of the hydraulic mechanism is reversed, that is, the shaft 90 is rotated in the opposite direction to effect a similar but reversed action on the devices 36 and 38. Thus, when the jack 10 is being lowered, it is the members 38 that expand somewhat longitudinally of the device 10 while the members 36 contract, with the members 36 and 38 being restored to and from their neutral positions by continued operation of the wobble plate structure that effects movement of the piston members 74.

If desired, the load will lower itself once the magnetic brake is released, and consequently it is not necessary to start the motor 91 to lower the load. This is because the frictional action of the sleeves 26 on their respective members 38 will effect a displacement action on the hydraulic liquid through the consecutive compression of the respective members 38 that actuates the wobble plate structure 70 and in effect "pumps" down the load.

FIGURE 2 illustrates diagrammatically the way that the various liquid supply passages may be connected between the various conduits 63 and 65 and the various collet devices 36 and 38.

Figure 10:
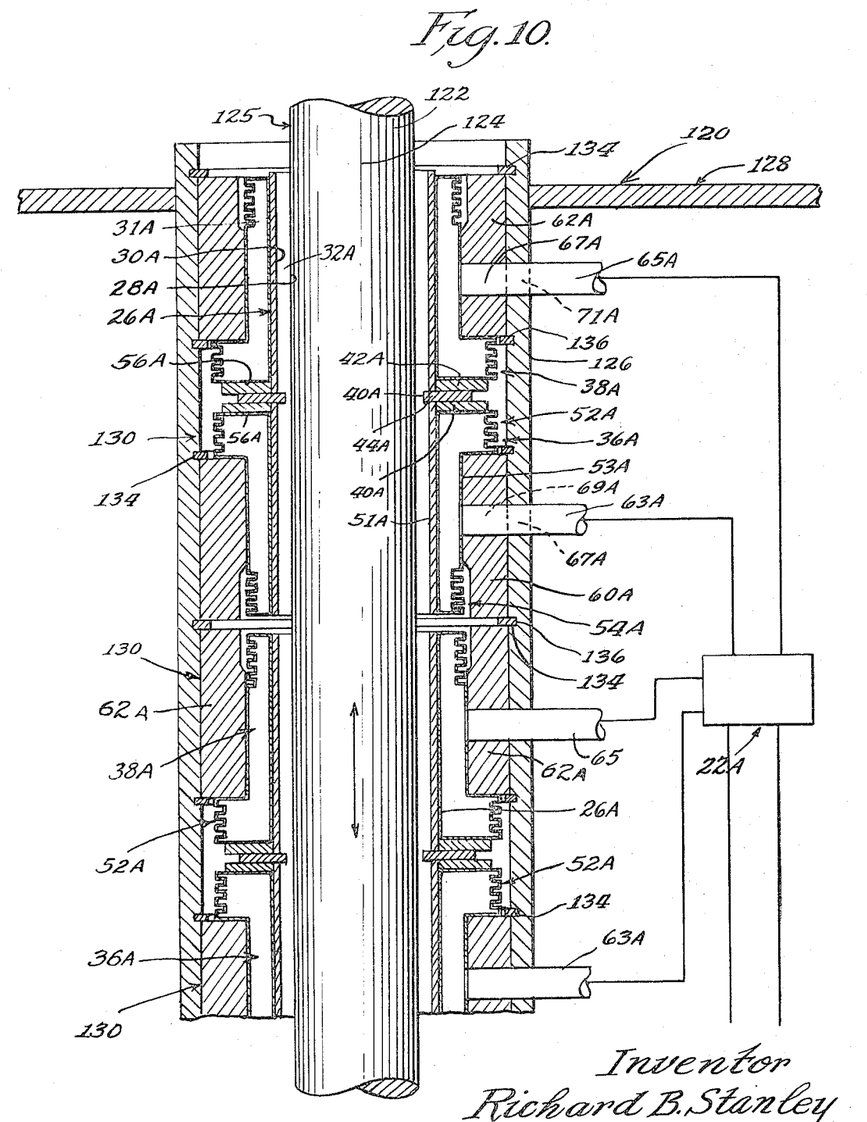
FIGURE 10 is a view similar to those of FIGURES 4, 6, and 9, but illustrating a modified form of the invention.

Referring now to the embodiment of FIGURE 10, reference numeral 120 indicates a step-by-step linear actuator in which the action of the collet members is inwardly rather than outwardly. The device 120 is assumed to be incorporated in a piece of machinery requiring the movement of shaft 122 in either direction for some manufacturing procedure, and it is understood that the shaft 122 is a straight smooth shaft with a cylindrical external surface 124, insofar as the portion 125 that extends through the device 120 is concerned.

The device 120 comprises a tubular shell or sleeve 126 mounted in any suitable manner within the machinery housing 128 and fixed against movement with respect to the housing 128. The shell 126 houses a series of three locking and movement actuating devices 130 which are arranged in a manner generally similar to the devices 20, as will be indicated by the use of similar reference numerals with the suffix A for similar parts. Thus, the individual devices 130 each comprise a pair of collet devices 36A and 38A which have the straight side walls 51A and the stepped diameter side walls 53A, although in the case of this embodiment, the side wall 51A defines the internal diameter of the respective devices 36A and 38A while the wall 53A defines the external diameters of such devices. Thus, the undulating portions 52A and 54A of the devices 36A and 38A are disposed on the exterior side of the respective devices 36A and 38A.

The respective collet devices 36A and 38A seat on annular abutment members 60A and 62A, respectively, which are held in place by lock rings 134 seated in recesses 136 of the sleeve 126.

Interposed between the shaft 122 and the collet devices 36A and 38A is a sleeve 26A and has characteristics similar to that of sleeve 26. Thus, the sleeve 26A is formed with internal grooves 30A that extend longitudinally thereof, and leave relatively thin web portions 31A that connect the internal ridges 32A that are defined by the grooves 30A.

The end walls 56A of the collet devices 36A and 38A seat against annular flanges or discs 40A and 42A, respectively, which in turn abut against locking ring 44A that is seated in the recess 46A formed in the sleeve 26A.

Conduits 63A and 65A extend between the respective openings of the sleeve 126 (and the corresponding openings of abutment sleeves 60A and 62A) to provide communication between the collet member openings 58A and a wobble plate type actuator of the type illustrated in FIGURE 4 which is shown in small scale block diagram form at 22A (the actual connections between the respective members 36A and 38A being the same as shown in FIGURE 2 and consequently the tubing connections are shown in diagrammatic form only).

The actuator 120 operates in a manner similar to that of FIGURES 1–9 except that the collet devices work inwardly against the sleeve 26A, which in turn contracts against the shaft 122 to grip same for movement in the direction dictated by the direction of rotation of the wobble plate structure 70 that forms a part of the hydraulic actuating device 22A.

The device 120 for the first time provides a way to move a smooth shaft member in either direction longitudinally thereof without any stroke limitations, and without requiring gearing or the like. For instance, if desired, the shaft 122 can be limitless in length and the hydraulic actuator unit 22A continuously operated to feed the shaft 122 in the direction desired.

SPECIFIC DESCRIPTION

Referring now more specifically to the hydraulic actuator 22, the wobble plate structure 70 comprises an annular member 130 having a shoulder at 132 for engagement with an annular flange portion 134 of ball bearing assembly 136 which is provided with a hub 138 that is connected to the shaft 90 through cross pin 140. The ball bearing assembly 136 rides on a support hub 142 that includes a tubular flange portion 144 which is journalled in bearing assembly 146 that is appropriately mounted within the housing assembly 148 that defines the wobble plate operating chamber 150.

The shaft 90 extends through the bore 152 of the tubular portion 144 and the external surface 154 of the shaft 90 substantially complements the internal surface 156 of the tubular portion 144.

As indicated in FIGURE 4, the support hub 142 defines an inclined surface 160 that defines the normal operating inclination of the wobble plate structure 70. The surface 160 at the thickest portion of the hub 142 is formed with a radially extending ball bearing receiving groove 162 in which rides a bearing ball 166 that engages within a spherically contoured socket 168 formed in the adjacent race member 170 of ball bearing assembly 136.

The wobble plate 130 at a point diametrically opposite the socket 166 is formed with a recess 172 (see FIGURE 4A) in its periphery in which is positioned a bearing ball 174 that rides in an arcuate raceway 176 formed in the spherically contoured wall surface 178 that defines the chamber 150. As indicated in FIGURE 4, the groove 176 complements the spherical contour of the wall 178. Interposed between the bearing ball 174 and the wobble plate 130 are a pair of smaller bearing balls 182, it being understood that the recess 172 is a socket proportioned to accommodate only balls 172 riding on top of the smaller balls 182. Thus, the ball 174 riding in the arcuate groove 176 of the housing 148 guides the up and down movement of the wobble plate structure when this movement is occasioned.

The support hub 142 is supported by compression spring 190 that is interposed between the bearing assembly 146 and the hub 142.

The arrangement of the hydraulic actuator 22 is such that when the member 12 for any reason cannot move under the pumping action provided by the hydraulic actuation unit 22, the wobble plate structure immediately levels off so that the piston members 74 will have zero displacement. This is an automatic reaction to the pressure build up that would be achieved by the member 12 engaging an over-solid stop or the like, as might be associated with the jack 10 to limit the height that the tubular member 12 can be lifted above the support 18.

The piston rods 72 are simplified in nature and each comprises a rod member 192 having ball shaped end portions 194 and 196 which have spherically contoured external surfaces 198 and 200, respectively. The end portions 196 seat in spherically contoured recesses 202 formed in the wobble plate structure while the end portions 194 respectively seat in the spherically contoured recesses 204 formed in the respective piston members 74.

The proportioning of the parts of the actuator and the incompressibility of the hydraulic liquid insures that the piston members 74 remain in operating engagement with the ends 194 of the respective piston rod members 192 regardless of the position of operation of the wobble plate structure 70.

It is the intention of this invention that the jack 10 be arranged to provide a hermetically sealed arrangement and for this purpose, the walls 53 of the members 36 and 38 are brazed to the respective abutment rings 60 and 62 to provide a leak-free seal about the ports or passages 65 and 67. As already mentioned, the securement of the seals 78 at their ends 80 is made similarly leak-free, with the result that the hydraulic liquid is hermetically sealed within the jack 10.

It is preferred that the abutment rings 60 and 62 of the respective devices 20 be affixed to the member 16 by a suitable adhesive, such as one of the epoxy resins.

It will therefore be seen that I have provided a linear actuator arrangement that will do the job that conventional linear actuators will do with one-third the volume of hydraulic liquid, one-half the cost, and at an efficiency on the order of 85 percent. As a matter of fact, it is the efficiency of the actuator that permits the load to lower itself insofar as the device 10 is concerned once the magnetic brake is released.

The hydraulic liquid of the actuator is hermetically sealed within the unit, and since only static seals form the hydraulic seal action, there can be no leakage during operation or at any other time.

It will now be apparent that the basic aspects of this device can not only be embodied in the structures as massive as automobile rack lifts, but it can also be embodied in push-pully devices of any convenient size, including miniaturized devices having very small diameters.

The actuator provides a step-by-step pushing or pulling action which can be unlimited in stroke and when the hydraulic actuation unit is at rest, it provides a sure and effective lock against undesired movement.

The quick lock and release action provided by the collet members of each lock device 20 or 20A permits a firm gripping action for moving the member to be moved in the desired directioin while at the same time providing for automatic return to neutral position of the opposed collet member.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. In a linear actuator,
a pair of members having portions of same in telescoping relation,
a pair of hydraulic liquid filled chambers interposed between said members,
each of said chambers defining inner and outer side portions in force transmitting relation to said members and transversely thereof,
said chamber side portions at adjacent ends of said chambers defining between the respective chamber side portions a cross-sectional area transversely of said members that is larger than that at the other ends thereof, with like of said side portions of the respective chambers being in concentric relation with one of said members and being substantially rectilinear longitudinally thereof,
and with the ratio of the difference of said areas of the respective chambers to the length of said like side portions thereof being no greater than the coefficient of friction between the respective like side portions and said one member,
a piston interposed between said adjacent ends of said chambers,
said adjacent ends of said chambers being in force transmitting relation to said piston,
a sleeve member interposed between said like side portions of said chambers and said one member,
said sleeve member being resiliently flexible circumferentially thereof,
said piston being keyed to said sleeve member,
and means for selectively and simultaneously supplying and withdrawing hydraulic liquid to and from said chambers in equivalent proportions to move said one member with respect to the other member.

2. The actuator set forth in claim 1 wherein said chambers, said piston and said sleeve member comprise a collet device, and including:
a plurality of said collet devices interposed between said members in end to end relation,
and wherein said hydraulic liquid supplying and withdrawing means includes means for simultaneously supplying hydraulic liquid to one like chamber of each pair of chambers of said devices and withdrawing the same amount of hydraulic liquid from the other of each pair.

3. The actuator set forth in claim 2 wherein:
said liquid hydraulic supplying and withdrawing means further includes:
means for blendingly relating the supply and withdrawal of hydraulic liquid to and from said chambers of the respective pairs of said chambers.

4. The actuator set forth in claim 3 wherein:
said supply and withdrawal means comprises:
a piston chamber for each of said liquid filled chambers,
a conduit communicating between each liquid filled chamber and its piston chamber,
each of said piston chambers having a piston member reciprocably mounted therein,
and means for reciprocating said piston members.

5. The actuator set forth in claim 4 wherein:
said liquid filled chambers, said conduits, and said piston chambers are hermetically sealed.

6. The actuator set forth in claim 5 including:
static seal means cooperating with said piston members for sealing off the hydraulic liquid in said piston chambers.

7. In a linear actuator,
a pair of inner and outer telescoping members,
a pair of hydraulic liquid filled chambers interposed between said members,
each of said chambers defining inner and outer side portions in force transmitting relation to said members, and transversely thereof,
said chamber side portions at adjacent ends of said chambers defining between the respective chamber side portions a cross-sectional area transversely of said members that is larger than that at the other end thereof,
with said outer side portions being in concentric relation with the outer of said members and being substantially rectilinear longitudinally thereof,
and with the ratio of the difference of said areas of the respective chambers to the length of said outer side portions thereof being no greater than the coefficient of friction between the respective outer side portions and the outer of said members,
a piston interposed between said adjacent ends of said chambers,
a sleeve member interposed between said outer side portions of said chambers and said outer member, said sleeve member being resiliently flexible circumferentially thereof, said piston being keyed to said sleeve member, said adjacent ends of said chambers being in force transmitting relation to said piston, and means for selectively and simultaneously supplying and withdrawing hydraulic liquid to and from said chambers in equivalent proportions to move said outer member with respect to said inner member.

8. In a linear actuator, a pair of inner and outer telescoping members, a pair of hydraulic liquid filled chambers interposed between said members, each of said chambers defining inner and outer side portions in force transmitting relation to said members, and transversely thereof, said chamber side portions at adjacent ends of said chambers defining between the respective chamber side portions a cross-sectional area transversely of said members that is larger than that at the other end thereof, with said inner side portions being in concentric relation with the inner of said members and being substantially rectilinear longitudinally thereof, and with the ratio of the difference of said areas of the respective chambers to the length of said inner side portions thereof being no greater than the coefficient of friction between the respective inner side portions and the inner of said members, a piston interposed between said adjacent ends of said chambers, a sleeve member interposed between said inner side portions of said chambers and said inner member, said sleeve member being resiliently flexible circumferentially thereof, said piston being keyed to said sleeve member, said adjacent ends of said chambers being in force transmitting relation to said piston, and means for selectively and simultaneously supplying and withdrawing hydraulic liquid to and from said chambers in equivalent proportion to move said inner member with respect to said outer members.

9. A hydraulic wedge device comprising:

an annular hollow chamber defining inner and outer side portions that are substantially rectilinear longitudinally of the axis of said chamber, said chambers being defined by a metallic wall of film properties, said chamber being undulated adjacent either end thereof on one of said side portions thereof.

References Cited

UNITED STATES PATENTS

| | | | |
|---|---|---|---|
| 2,102,797 | 12/1937 | Helmer | 74—18.2 X |
| 2,149,040 | 2/1939 | Binder et al. | 74—18.2 X |
| 2,858,126 | 10/1958 | Gomez | 74—18.1 X |

EDGAR W. GEOGHEGAN, *Primary Examiner.*